R. A. SMITH.
SPIRAL SPRING COUPLING.
APPLICATION FILED APR. 24, 1920.
1,365,957.
Patented Jan. 18, 1921.
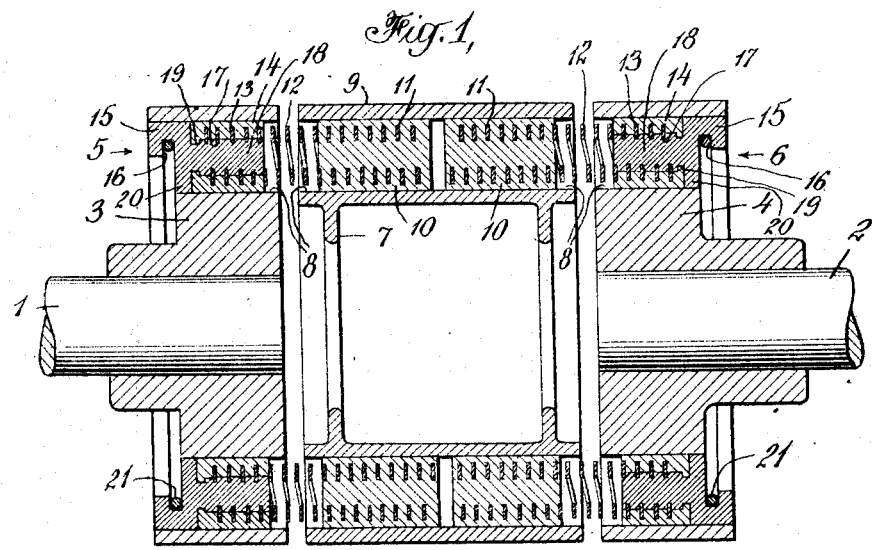
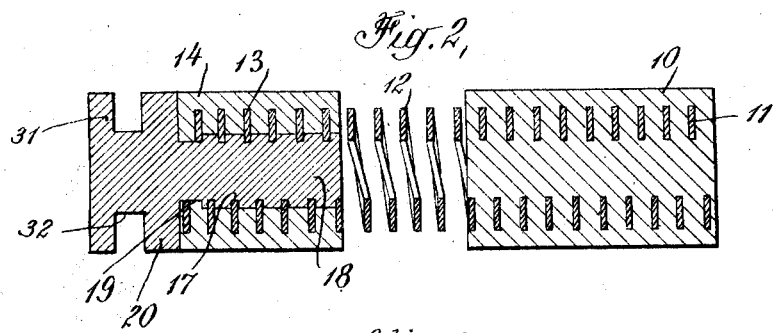
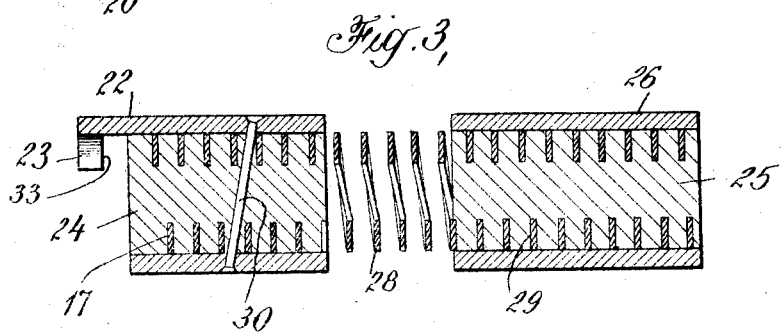
Inventor
Robert A. Smith
By his Attorney
Harry L. Duncan

UNITED STATES PATENT OFFICE.

ROBERT A. SMITH, OF MAHWAH, NEW JERSEY, ASSIGNOR TO SMITH AND SERRELL, OF MAHWAH, NEW JERSEY, A COPARTNERSHIP CONSISTING OF ROBERT A. SMITH AND JOHN J. SERRELL.

SPIRAL-SPRING COUPLING.

1,365,957.  Specification of Letters Patent.  Patented Jan. 18, 1921.

Application filed April 24, 1920. Serial No. 376,260.

*To all whom it may concern:*

Be it known that I, ROBERT A. SMITH, a citizen of the United States, and resident of Mahwah, Bergen county, State of New Jersey, have made a certain new and useful Invention Relating to Spiral-Spring Couplings, of which the following is a specification, taken in connection with the accompanying drawing, which forms part of the same.

This invention relates especially to flexible couplings in which coöperating coupling members which may be adapted for connection with shafts are formed with coöperating or alined holes arranged in any suitable position and preferably annularly arranged adjacent the outer or peripheral portion of the coupling members. The resilient coupling pins arranged in these holes in the coöperating coupling members which preferably comprise a floating ring or intermediate coupling member may with advantage be formed with a substantially rigid end on one or both ends of the coupling pins so that, if desired, one end may be slidingly or otherwise movably supported in the hole in the coupling member. The intermediate connecting or bridging portion of the coupling pins located, for example, adjacent the points where the pins bridge across between adjacent coupling members is preferably formed of one or more spiral spring elements and these spiral springs are preferably formed of flat sectioned spring strip which when radially arranged so that the flat section of the spring strip lies in substantially radial or other generally transverse position with respect to the axis of the coupling pin insures increased bending resilience or yield in the coupling pin as compared to its yield under driving force or torque. In this way, in a double coupling the transverse bending of one or both sets of the resilient coupling pins is usually sufficient to take up any reasonable degree of annular and eccentric misalinement in the coupling members so that the spring yielding portions of the coupling pins can operate under efficient conditions especially when one end of the pin is slidingly mounted in the corresponding coupling member. Although it is not in all cases necessary this relatively flat or elongated section strip or material for the spiral spring elements of the coupling pins is highly desirable and by making the ratio of the width to the thickness of the spring strip three to six times more or less correspondingly great bending resilience as compared to the driving resistance can be secured.

In the accompanying drawing showing in a somewhat diagrammatic way various illustrative embodiments of the invention, Figure 1 is a longitudinal section through one form of coupling.

Fig. 2 is an enlarged longitudinal sectional view through a slightly modified type of pin; and Fig. 3 is a similar enlarged sectional view through another pin construction.

The coupling members may be of any suitable size, shape and construction and the outer coupling members 3, 4 may be of suitable flanged and cast iron construction and provided with central holes adapted to be connected in any desired way with the shafts 1, 2. These coupling members and also the intermediate or floating ring coupling member 9 which may be advantageously used in many cases may as indicated be provided with coöperating or substantially alined holes 8 which as indicated may be arranged in one or more annular series around the coupling members preferably adjacent their peripheral or outer portions so that eight to twenty of these holes more or less may be arranged around the periphery of each coupling member.

The resilient coupling pins which may be used in this connection may advantageously be provided with a substantially rigid end on at least one end of each coupling pin so that sliding and even rotary movement in some cases can take place between the coupling pin and the intermediate or other coupling member with which it coöperates. Where such relative movement is provided between the intermediate coupling member and the pins this floating ring coupling member, such as 9, may be formed with suitable internal flanges, such as 7, to facilitate oiling of the parts in a well known manner. These coupling pins are advantageously formed with one or more spiral spring elements at their connecting or intermediate portions and if desired both ends of the pins may be of substantially rigid material, one suitable arrangement being shown in Fig. 2 as comprising a rigid cast end 10 of any suitable Babbitt or other metal which may be cast or otherwise formed around the end 11 of the spiral spring element which may thus be embedded in and secured to the pin end in a convenient and effective way. The other end 13 of this spiral spring element may as indicated be screwed or forced onto the brass or other rigid core 18 which may in some cases be formed with a helical groove 17 corresponding to the flat, round or other sectioned spring strip used, and if desired this core may be formed with an integral head 31 provided with one or more locking or holding portions, such, for instance, as the annular locking recess 32 shown in Fig. 2 which allows slow or slight rotary movement of the pin while held in longitudinal alinement in the hole in the coupling member. If desired, however, a single locking recess 16 may be provided nearer one side of the pin head 15 as is shown in Fig. 1. As there shown the coöperating locking rings or members 21 may be forced or snapped into these locking recesses in the ends of the pins 5, 6 so as to hold them in proper longitudinal alinement in the holes in the outer coupling members in which they may also, if desired, be thus held against rotation in some cases. In this way the adjacent inner ends 10 of these resilient coupling pins are free to move longitudinally within the holes 8 in the intermediate or floating ring coupling member 9 so as to readily accommodate any longitudinal component of the means due to misalinement of the parts, while at the same time the connecting portions of the spiral spring elements may be made sufficiently yielding to give the desired cushioning action or yielding driving torque. Of course the brass, cast iron or other rigid core 18 may have its outer end portion sufficiently long to properly support the spring element, although as indicated in Fig. 2 it is usually desirable to use an outer shell 14 of any suitable material, such, for instance, as a cast filling of Babbitt metal, type metal or other material which definitely holds the end 13 of the spring element in place and also provides a desirable bearing or supporting material to engage the hole.

The resilient yielding of any of these pins may of course be varied or regulated by varying the length of the free connecting portion 12 of the spring element which may comprise three to eight free turns more or less and also by the size and character of the spring strip which is also of considerable importance in this connection. By making the spring up out of flat or other non-circular sectioned strip the spring element at any part of the spiral may be rendered considerably more yielding to such transverse bending along the curve of the spring as takes place when the resilient pin is bent in simple flexure as compared, for instance, with the driving torque forces. The driving torque tends to cause a shearing movement of the two ends of the pin which under the driving force tend to move out of line with each other while still remaining substantialy parallel, the intermediate parts bending somewhat so that some incidental flexure is combined with the shearing action; thus the intermediate connecting portion of the spiral spring is apparently subjected to a stress which tends to open out or force together each one of the turns of the spiral spring according to the direction of driving movement. This of course tends to bend the flat spring section edgewise as compared to flatwise as occurs under the simple bending of the resilient pin caused by misalinement movement which can thus take place more readily and with correspondingly less injury to the spring material. By varying the ratio of the width and thickness of the spring strip material, correspondingly great differences between the stiffness of the spiral spring under these two bending actions can be produced, since in a simple straight beam of rectangular cross-section the stiffness against edgewise bending as compared to flatwise bending varies substantially as the square of the ratio of the width to the thickness of the beam section.

As indicated in Figs. 1 and 2 the spring strip may have a number of times greater width than thickness so as to secure increased yielding action of the resilient pin under simple bending forces. In some cases the width of the spring strip may be two to six times the thickness more or less, the ratio indicated in the drawing being three or four times. It is also usually desirable to have a number of turns of the spring element free to act in this connecting portion of the resilient coupling pins and where this spring element is of less diameter than the end portions of the pin any such movement can take place with relative freedom within the usual or desired range of relative movement of the coupling members and also the engagement of the spring element with the sides of the holes in which the pin ends are arranged may serve as an emergency stop or protection against overstrain so as to minimize breakage of the spring elements under some conditions.

Fig. 3 shows another form of spiral spring resilient coupling pin of this general type. The spring element which as shown is formed of flat sectioned strip arranged substantially radially to the pin axis may have an intermediate or free connecting portion 28 comprising any suitable number of turns and of considerably less diameter than the pin ends. These pin ends may, if desired, be formed or provided with shells 22, 26 of brass, bronze or other suitable material in which the spring ends 17, 29 may be arranged, and if desired, held or retained as by one or more retaining pins or rivets 30. If desired also a cast in filling or holding element 24, 25 of Babbitt metal, type metal or other suitable material may be cast or forced into the shells and the springs ends so as to definitely and securely hold these parts in desired coöperation. Alining or locking means may be provided on one or both of the shells or pin ends and for this purpose one of the shells may be formed with a locking or holding recess 33 within the projecting ends 23 of this annular shell so that, if desired, a locking ring may be snapped into this recess in the same general way as indicated in Fig. 1.

This invention has been described in connection with a number of illustrative embodiments, forms, proportions, parts, shapes, materials, arrangements and methods of manufacture and use, to the details of which disclosure the invention is not of course to be limited, since what is claimed as new and what is desired to be secured by Letters Patent is set forth in the appended claims:

1. In yieldable shaft couplings, coöperating coupling members formed with substantially alined series of holes around their peripheral portions and comprising a floating ring intermediate coupling member and series of resilient coupling pins arranged in said holes and having flat sectioned spiral spring connecting portions bridging the spaces between adjacent coupling members, the flat sectioned spring material of said connecting portions being substantially radially arranged to provide increased bending deflection of said pin and substantially rigid ends on said coupling pins, one of which is slidably mounted in one of the coöperating holes in said coupling members.

2. In yieldable shaft couplings, coöperating coupling members formed with substantially alined series of holes around their peripheral portions and comprising an intermediate coupling member and series of resilient coupling pins arranged in said holes and having flat sectioned spiral spring connecting portions bridging the spaces between adjacent coupling members, the flat sectioned spring material of said connecting portions being transversely arranged to provide increased bending deflection of said pin.

3. In yieldable shaft couplings, coöperating coupling members formed with coöperating series of holes around their peripheral portions and comprising a floating ring intermediate coupling member and series of resilient coupling pins arranged in said holes and having flattened sectioned spiral spring connecting portions bridging the spaces between adjacent coupling members, the width of the spring material of said connecting portions being transversely arranged to provide increased bending deflection of said pin and substantially rigid ends on at least one end of said coupling pins, which is slidably mounted in one of the coöperating holes in said coupling members.

4. In yieldable shaft couplings, coöperating coupling members formed with coöperating series of holes and comprising an intermediate coupling member and series of resilient coupling pins arranged in said holes and having flattened sectioned spiral spring connecting portions bridging the spaces between adjacent coupling members, the width of the spring material of said connecting portions being transversely arranged to provide increased bending deflection of said pin and substantially rigid ends on at least one end of said coupling pins which is movably mounted in one of the coöperating holes in said coupling members.

5. In yieldable shaft couplings, coöperating coupling members formed with coöperating series of holes and comprising an intermediate coupling member and series of resilient coupling pins arranged in said holes and having spiral spring connecting portions bridging the spaces between adjacent coupling members, and substantially rigid ends on at least one end of said coupling pins which is movably mounted in one of the coöperating holes in said coupling members.

6. In yieldable shaft couplings, coöperating coupling members formed with coöperating series of holes around their peripheral portions and comprising an intermediate coupling member and series of resilient coupling pins removably arranged in said holes and having non-circular sectioned spiral spring connecting portions bridging the spaces adjacent coupling members, and substantially rigid ends on one end of each of said coupling pins which is slidably mounted in one of the coöperating holes in said intermediate coupling member.

7. In yieldable shaft couplings, coöperating coupling members formed with coöperating series of holes around their peripheral portions and comprising an intermediate coupling member and series of resilient coupling pins removably arranged in said holes and having non-circular sectioned spiral spring connecting portions and substantially rigid ends on one end of each of said coupling pins which is slidably mounted in one of the coöperating holes in said intermediate coupling member.

8. In yieldable shaft couplings, coöperating coupling members formed with coöperating substantially alined series of holes around their peripheral portions and comprising an intermediate coupling member and a series of resilient coupling pins removably arranged in said holes and having spiral spring connecting portions comprising three to eight free spring coils bridging the spaces between adjacent coupling members and substantially rigid pin ends adapted to engage the coöperating holes in said coupling members and having a greater diameter than said spiral spring connecting portions to allow limited transverse movement of said connecting portions under operating conditions.

9. In yieldable shaft couplings, coöperating coupling members formed with coöperating series of holes around their peripheral portions and comprising an intermediate coupling member and a series of resilient coupling pins removably arranged in said holes and having spiral spring connecting portions comprising three to eight free spring coils and substantially rigid pin ends adapted to engage the coöperating holes in said coupling members and having a greater diameter than said spiral spring connecting portions.

10. In yieldable shaft couplings, coöperating coupling members formed with coöperating series of holes around their peripheral portions and comprising an intermediate coupling member and a series of resilient coupling pins arranged in said holes and having spiral spring connecting portions comprising over three free spring coils and substantially rigid pin ends adapted to slidingly engage the coöperating holes in one of said coupling members.

11. In yieldable shaft couplings, coöperating coupling members formed with coöperating substantially alined series of holes around their peripheral portions and comprising a floating intermediate coupling member and a series of resilient coupling pins arranged in said holes and having spiral spring connecting portions comprising over three spring coils bridging the spaces between adjacent coupling members and substantially rigid pin ends adapted to movably engage the coöperating holes in one of said coupling members.

12. In yieldable shaft couplings, coöperating coupling members formed with coöperating substantially alined series of holes around their peripheral portions and a series of resilient coupling pins arranged in said holes and having spiral spring connecting portions comprising spring coils bridging the spaces between adjacent coupling members and substantially rigid pin ends adapted to movably engage the coöperating holes in one of said coupling members.

13. In yieldable shaft couplings, coöperating coupling members formed with coöperating series of holes around their non-central portions and a series of resilient coupling pins arranged in said holes and having spiral spring connecting portions and substantially rigid pin ends adapted to engage the coöperating holes in said coupling members and having a greater diameter than said spiral spring connecting portions to allow limited transverse movement of said connecting portions under operating conditions, said spiral spring connecting portions being formed of non-circular sectioned spring material having its greatest dimension several times its thickness and arranged transversely of the pin axis to provide increased bending deflection of the pin as compared to the resilient driving movement thereof.

14. In yieldable shaft couplings, coöperating coupling members formed with coöperating series of holes around their non-central portions and a series of resilient coupling pins arranged in said holes and having spiral spring connecting portions and substantially rigid pin ends adapted to engage the coöperating holes in said coupling members, said spiral spring connecting portions being formed of non-circular sectioned spring material having its greatest dimension several times its thickness and arranged transversely of the pin axis to provide increased bending deflection of the pin as compared to the resilient driving movement thereof.

15. In yieldable shaft couplings, coöperating coupling members formed with coöperating series of holes and a series of resilient coupling pins arranged in said holes and having spiral spring connecting portions and substantially rigid pin ends adapted to engage the coöperating holes in said coupling members, said spiral spring connecting portions being formed of non-circular sectioned spring material having its greatest dimension over three times its thickness and arranged transversely of the pin axis to provide increased bending deflection of the pin as compared to the resilient driving movements thereof.

16. In yieldable shaft couplings, coöperating coupling members and spiral spring connecting members arranged in non-axial position and engaged by coöperating portions on said coupling members to cause a shearing movement in the elements of the spring connecting members under driving conditions, said spiral spring connecting members being formed of flat sectioned spring material having its greatest dimension several times its thickness and arranged transversely of the spring axis to provide increased bending deflection of the spring connecting members as compared to the resilient driving movement thereof.

17. In yieldable shaft couplings, coöperating coupling members and spiral spring connecting members arranged in non-axial position and engaged by coöperating portions on said coupling members to cause a shearing movement in the elements of the spring connecting members under driving conditions, said spiral spring connecting members being formed of flat sectioned spring material having its greatest dimension arranged transversely of the spring axis to provide increased bending deflection of the spring connecting members as compared to the resilient driving movement thereof.

18. In yieldable shaft couplings, coöperating coupling members and spiral spring connecting members arranged in non-axial position and engaged by coöperating peripheral portions on said coupling members to cause a shearing displacement in the elements of the spring connecting members under driving conditions, said spiral spring connecting members being formed of non-circular sectioned spring material having its greatest dimension several times its thickness and arranged transversely of the spring axis to provide increased bending deflection of the spring connecting members as compared to the resilient driving movement thereof.

19. In yieldable shaft couplings, coöperating coupling members and spiral spring connecting members arranged in non-axial position and engaged by coöperating portions on said coupling members to cause a shearing displacement in the elements of the spring connecting members under driving conditions, said spiral spring connecting members being formed of non-circular sectioned spring material having its greatest dimension arranged transversely of the spring axis to provide increased bending deflection of the spring connecting members as compared to the resilient driving movement thereof.

ROBERT A. SMITH.